United States Patent

[11] 3,602,884

[72] Inventor Joseph S. Brumbelow
    35 Winn St., Burlington, Mass. 01803
[21] Appl. No. 10,414
[22] Filed Feb. 11, 1970
[45] Patented Aug. 31, 1971
    Continuation-in-part of application Ser. No.
    699,646, Jan. 26, 1968, now abandoned.

[54] TIRE CONDITION MONITORING SYSTEM
    4 Claims, 5 Drawing Figs.
[52] U.S. Cl. .................................................. 340/58,
                                                    200/61.22
[51] Int. Cl. ............................................... B60c 23/00
[50] Field of Search ........................................ 340/58;
                                            200/61.22, 61.25, 61.26

[56] References Cited
    UNITED STATES PATENTS
3,092,806  6/1963  Field ............................ 340/58

3,374,460  3/1968  Massoubre ..................  340/58

Primary Examiner—Alvin H. Waring
Attorney—Louis Orenbuch

ABSTRACT: A tire monitoring system for a motor vehicle employs a wheel mounted unit which is physically unattached to the remainder of the system. A primary unit of the system is situated to be inductively coupled to the wheel unit. The inductive coupling is intermittent inasmuch as the wheel unit is adjacent to the primary unit during only a part of the wheel's rotation. The wheel unit uses a sensor to monitor the tire pressure or temperature and the sensor, in response to an unsafe condition of the tire, causes an alteration in the amount of energy coupled by induction to the wheel unit. The change in energy is detected by comparing the energy delivered to the inductively coupled element in the primary unit with the energy delivered to a "standard" element which is not affected by the inductive coupling. The detected change in inductively coupled energy is amplified and the amplified signal is employed to actuate an alarm.

INVENTOR
JOSEPH S. BRUMBELOW
BY *Louis Orenbuch*
ATTORNEY

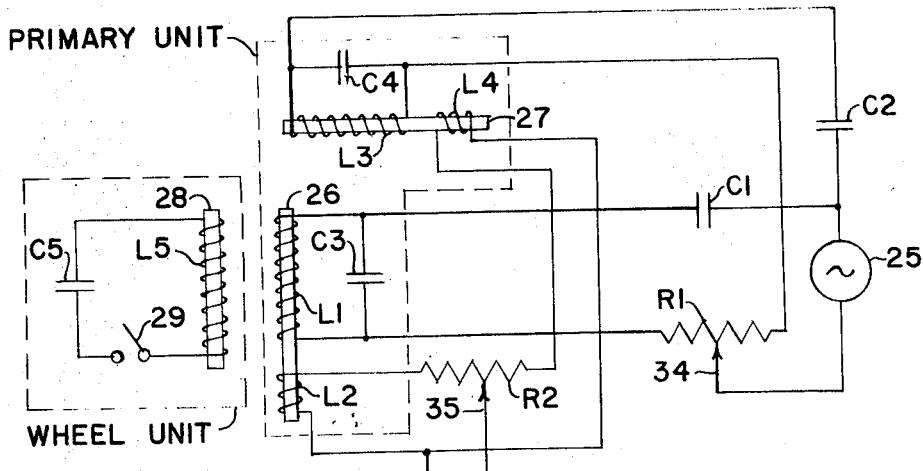
FIG. 3
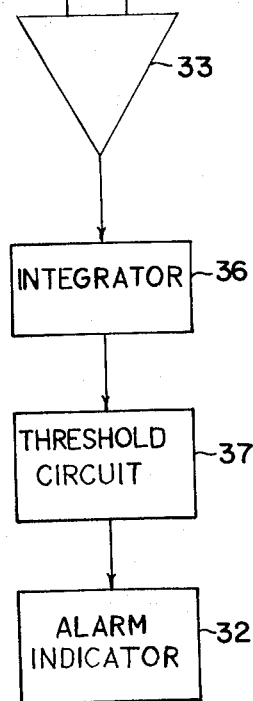
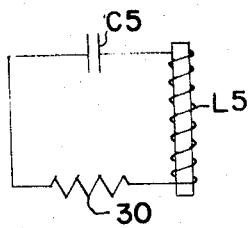
FIG. 4   FIG. 5
INVENTOR
JOSEPH S. BRUMBELOW
BY Louis Orenbuch
ATTORNEY

TIRE CONDITION MONITORING SYSTEM

This application is a continuation-in-part of my copending patent application Ser. No. 699,646 which was filed in the U.S. Pat. Office on Jan. 26, 1968, and now abandoned.

FIELD OF THE INVENTION

This invention relates in general to sensing systems for detecting hazardous conditions at a remote location. More particularly, the invention pertains to an alarm system which permits the temperature or pressure of the tires of a motor vehicle to be reliably sensed without requiring a physical connection between the sensor mounted on the rotating tire and the remainder of the system.

Underinflated pneumatic tires, as is well known, tend to generate excessive heat because of the inordinate flexing of the sidewalls as the tire rotates and because of the increased frictional resistance due to the larger area of the tire which is in contact with the road. The presence of an underinflated tire usually becomes noticeable to the vehicle operator by the sluggish response of the vehicle and an impairment in control. However, because of the number and arrangement of wheels on the larger trucks and trailers, the operator of the vehicle may not become aware of the dangerous condition of a tire until serious damage to the tire has occurred. Excessive heat generated by underinflated tires has on occasion been known to cause the tires to burn while the vehicle is in operation. Where a vehicle is carrying a cargo that is inherently dangerous, such as lethal gases or acids, it is of great importance that the operator of the vehicle be immediately apprised when a tire is in poor condition because of underinflation or excessive temperature.

DISCUSSION OF THE PRIOR ART

Electrical and electromechanical systems have been employed for monitoring the pressure in vehicular pneumatic tires. Prior systems have usually required a physical connection, such as the slip ring and brush described in U.S. Pat. 2,439,561, to transmit information from the sensor on the rotating tire to the portion of the system mounted on the vehicle body. The effects of inclement weather, bad roads and other severe environmental conditions encountered in the operation of motor vehicles may tend in time to cause the physical connection to become unreliable and the replacement or repair of the physical connection involves an expense that it is desired to avoid. To avoid the necessity for a physical connection, tire monitoring systems have been proposed in which the information from the sensor is sent by a transmitter unit in the wheel to a physically detached receiver on the vehicle body. Such schemes however require that the transmitter unit be powered by batteries or some other power source on the wheel and create a new problem in assuring a reliable power supply for the transmitter unit. More recently, tire monitoring systems such as those described in U.S. Pats. 2,629,086 and 3,374,460 has been proposed in which the tire mounted unit is physically unattached to the remainder of the system and does not require its own power supply.

OBJECTIVE OF THE INVENTION

The principal objective of the invention is to provide a sensing system which reliably detects abnormal conditions of a tire, such as excessive temperature or low pressure, and actuates an alarm to make the presence of the abnormal condition known. An important aspect of the invention is that no physical connection is made between the portion of the system mounted on the rotating wheel and the remainder of the system nor is any independent power source required for the wheel mounted part of the system.

THE INVENTION

The invention resides in a system having a wheel mounted unit which is physically separated from the remainder of the system and a primary unit having a resonant element which is coupled by induction to the wheel unit. The primary unit also has a "standard" resonant element which is not affected by the inductive coupling to the wheel unit. The wheel unit is mounted to pass close to the primary unit during each revolution of the wheel at which time the inductive coupling is effective. The wheel unit employs a sensor to monitor the tire pressure or temperature and the sensor responds to an unsafe condition of the tire by altering the amount of energy coupled by induction to the wheel unit. The energy is obtained from the coupled resonant element in the primary unit and thereby upsets the balance of the energy which is apportioned between the "standard" resonant element and the coupled resonant element. The energy in the coupled inductive element of the primary unit is compared to the energy in the "standard" element and the difference, which is the energy inductively coupled to the wheel unit, is employed as the input signal to an amplifier. The output signal of the amplifier is preferably integrated and when the integrated signal reaches a threshold level, an alarm is actuated to make known the dangerous condition of the tire.

THE DRAWINGS

The invention, both as to its arrangement and mode of operation, can be better understood from the exposition which follows, when considered in conjunction with the accompanying drawings in which.

FIG. 3 schematically illustrates the preferred embodiment of the invention in which the wheel unit circuit utilizes a switch controlled by the sensor;

FIG. 4 depicts the wheel unit circuit employing a thermistor to sense the temperature of the tire; and FIG. 5 illustrates an arrangement of the wheel unit circuit using a "Curie point" ferromagnetic core to sense the temperature of the tire.

THE EXPOSITION

Figure 1:
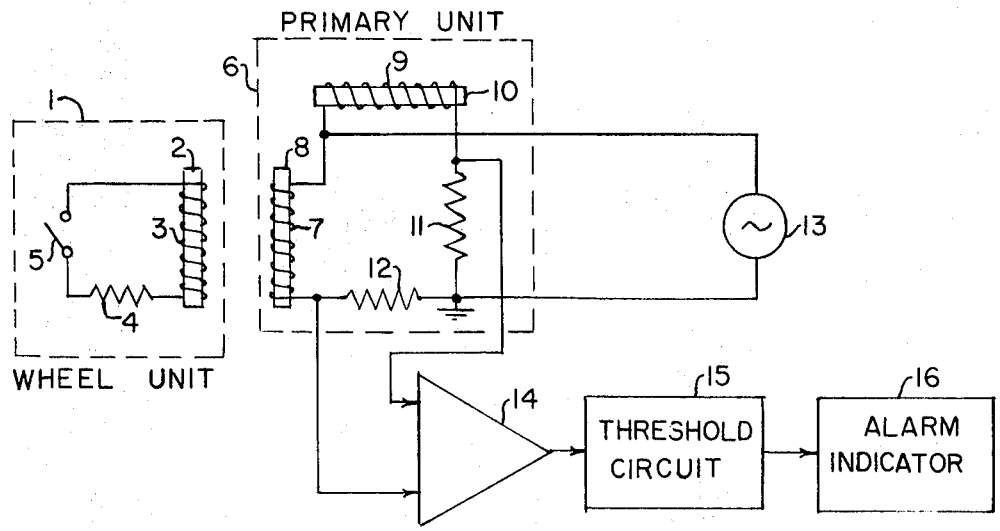
FIG. 1 depicts the scheme of a rudimentary form of the invention.

FIG. 1 shows the scheme of a rudimentary form of the invention. In that figure, the apparatus which is mounted to rotate with the tire is within the box designated as the "wheel unit." The "wheel unit" 1 is separated from and is physically unattached to the remainder of the system. In the wheel unit is a ferromagnetic core 2 upon which is disposed a coil 3 that is serially connected to a resistor 4. The device which senses the pressure or temperature of the tire is indicated in FIG. 1 by the normally open switch 5. For the purpose of exposition, it is assumed that the device is a pressure sensitive switch which is maintained open when the pressure in the tire is within a predetermined range and closes when the pressure falls or rises above that range.

Disposed on the vehicle body in a position adjacent to the path of the wheel unit is the "primary unit" 6. The primary unit is fixed in position relative to the wheel unit whereby the wheel unit once during each revolution of the wheel, is brought into juxtaposition with the primary unit. In the primary unit 6 is a coil 7 that is disposed upon a ferromagnetic core 8 which is situated to inductively couple to the coil 3 in the wheel unit when that unit is in its juxtaposed position. Also within the primary unit is a second coil 9 wound upon a ferromagnetic core 10 which is situated so that it does not inductively couple to either the coil 7 or the coil 3. The inductor constituted by the coil 9 and core 10 is preferably identical with the inductor constituted by the coil 7 and core 8 and both inductors are situated on the motor vehicle to cause them to be subject to the same environment whereby they are equally affected by changes in temperature, humidity, and other environmental factors.

The coil 9 is serially connected to a resistor 11 and coil 7 is similarly connected to a resistor 12. Each coil and its serial resistor are energized by an AC signal from a source 13. The coil 7 and resistor 12 are effectively in parallel with coil 9 and resistor 11 with respect to the AC source. In the absence of an inductive link to the coil 3 in the wheel unit, the currents in the coils 7 and 9 in an ideal system are equal and the voltage drops across resistors 11 and 12 are equal where those resistors are of identical ohmic value. A differential amplifier 14 is connected to the resistors to amplify any difference in voltage across resistors 11 and 12. The output of the differential amplifier is impressed upon a threshold circuit 15 which, when its threshold value is exceeded by the input signal from amplifier 14, emits a signal that actuates an alarm indicator 16.

So long as the pressure in the tire monitored by the pressure sensitive switch 1 is sufficient to maintain the switch in its open condition, the energy coupled by induction from coil 7 to the coil 3 when the wheel unit is juxtaposed to the primary unit is reflected and thus no noticeable difference in voltage occurs across resistors 11 and 12. Where the pressure in the tire decreases to the level where the pressure sensitive switch closes, the next occurrence of juxtaposition between the wheel unit and the primary unit causes the energy inductively coupled to coil 3 to be dissipated in the resistor 4. The energy that is dissipated is, of course, obtained from the coil 7 and thus the current in coil 7 is affected whereas the current in coil 9 is unaffected since that coil is not inductively coupled to either the coil 7 or the coil in the wheel unit. The voltage drops across resistors 11 and 12, consequently, become significantly unequal for the time that coil 7 is inductively coupled to coil 3. The voltage difference, when amplified by amplifier 14, exceeds the threshold of circuit 15 and causes that device to emit a signal which actuates the alarm indicator 16. The threshold circuit, in a simple form, may be a monostable multivibrator which is normally in its stable state and upon receiving an input signal of sufficient magnitude is triggered into its unstable state. The AC source 13 is preferably a sine wave oscillator.

The period during which the voltage drops across resistors 11 and 12 are unequal depends for its duration upon the rate at which the wheel rotates. Where the vehicle is moving at a slow speed, the duration of the period is long but its repetition rate is low. Where the vehicle is moving at high speed, the duration of the period is short but its repetition rate is high. The output of the amplifier 14 is thus a train of pulses which depends upon the rate of rotation of the wheel unit. If desired, the pulse output of amplifier 14 can be integrated and the output of the integrator may be used as the input signal to the threshold circuit 15.

Where the source 13 emits an AC signal whose frequency relative to the rate of rotation of the tire is such that at least several signal alternations occur while the primary unit is inductively coupled to the wheel unit, each train of pulses will contain alternate negative and positive going pulses. To prevent the pulses from nullifying each other in the integrator, a rectifier, such as a diode, may be employed to block either the negative or positive pulses whereby pulses of only one polarity can pass into the integrator. Alternatively, instead of blocking pulses of one polarity, those pulses can be inverted by conventional techniques and passed into the integrator to provide an augmented signal to the threshold circuit.

Figure 2:
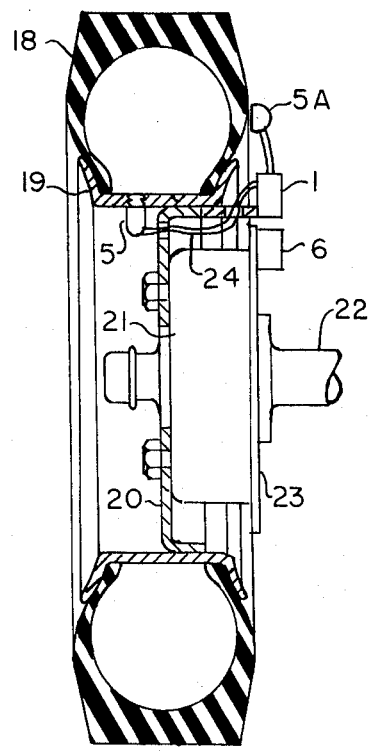
FIG. 2 shows the arrangement of the invention in relation to the wheel and adjacent parts of a vehicle.

FIG. 2 depicts an arrangement of the invention in relation to the wheel and adjacent parts of a motor vehicle. In FIG. 2, the pneumatic tire 18 is mounted upon the rim 19 of a wheel 20 which is bolted to a hub 21 that can rotate about the axle 22. Secured upon the axle 22 is a spindle plate 23 that is stationary with respect to the wheel. The wheel unit 1 of the invention is preferably enclosed in a nonmagnetic housing to protect it from damage and deterioration. The housing is secured to the wheel 20 and electrical leads 24 connect the coil and resistor of the wheel unit to the pressure sensitive switch 5. Where the tire is of the "tubeless" variety, the pressure sensitive switch can be secured in the manner shown in FIG. 2 to the wheel rim where it does not impede mounting or demounting of the tire. To permit testing of the pressure sensitive switch in the routine maintenance of the warning system, the switch is preferably threaded to permit it to be detached from the wheel. Where the tire is of the type having an inner tube, the pressure sensitive switch can be mounted on the valve stem or in any other location where it can sense the pressure in the inner tube.

If desired, the temperature of the tire can be monitored in lieu of or in addition to monitoring the tire pressure. As indicated in FIG. 2, the temperature sensor 5A is mounted to be in good thermal contact with the casing of tire 18. The temperature sensor may, for example, be of the bimetallic type which closes to complete an electrical circuit when the temperature rises above a preset level. The temperature sensor may, alternatively, be a thermistor whose resistance drops to a low value when the tire overheats.

In ideal circumstances, the frequency of source 13 is not critical and the source could even be DC rather than AC However, to keep the power required to operate the system within reasonable limits, the frequency of the source is preferable maintained constant at a frequency where the inductance of coils 7 and 9 in conjunction with resistors 11 and 12 restrict the currents to reasonable values.

FIG. 3 schematically depicts the preferred embodiment of the invention. In the preferred embodiment, the signal source 25 is connected by coupling capacitors C1 and C2 to a pair of resonant circuits which are turned to resonate at the same frequency. The signal source 25 is, preferably, a stable oscillator whose output is at the resonant frequency of the two resonant circuits which are situated in the primary unit of the system. One resonant circuit employs a coil L1 wound upon a ferromagnetic core 26 carrying a takeoff coil L2. A capacitor C3 is connected across coil L1 to form a parallel resonant circuit. If desired, the capacitor C3 can be of the variable capacity type to permit tuning to the resonant frequency. The other resonant circuit is preferably identical to the first and employs a coil L3 wound upon a ferromagnetic core 27 carrying a takeoff coil L4. A capacitor C4 is connected across coil L3 to form a parallel resonant circuit tuned to resonate at the same frequency as the other resonant circuit in the primary unit. To prevent the coils L3 and L4 from inductively coupling to the other coils in the primary unit or to the inductor in the wheel unit constituted by the coil L5 wound upon the core 28, a magnetic shield can be employed around coils L3 and L4. The L3—C4 resonant circuit is employed as a "standard" for the comparison of its energy with the energy in the L1—C3 tank.

The characteristics of the sensors employed to monitor the temperature or pressure of the tire, in part determine the circuitry employed in the wheel unit. For example, where the sensor is of the type which controls a switch 29, as in FIG. 3, which has only two states, open or closed, the coil L5 is placed in series with a capacitor C5 and with the switch. When the tire temperature or pressure is within the safe range, the switch 29 is open and the energy inductively coupled from coil L1 to coil L5 is almost totally reflected back to coil L1. Should the switch 29 close, in response to an unsafe drop in tire pressure for example, the coil L5 and capacitor C5 become a resonant circuit which, being resonant at the same frequency as the circuit to which it is inductively coupled, absorbs energy from the energy in the resonant tank L1—C3. The takeoff coil L2, being inductively coupled to coil L1, senses the drop in energy in the tank L1—C3.

Where, as in FIG. 4, the sensor is a thermistor 30 which is in series with the coil L5 and capacitor C5, the high resistance of the thermistor when the tire temperature is within the "safe" range prevents any large amount of energy from being transferred by induction to coil L5. Should the tire temperature rise to an unsafe value, the resistance of the thermistor decreases sufficiently to permit coil L5 and capacitor C5 to resonate and draw more energy from the tank L1—C3.

The coil L5, as in FIG. 5, may be wound upon a core 31 which is constituted of a ferromagnetic material whose Curie point is at the temperature where the tire may be damaged by excessive heat. At the Curie point temperature, the ferromagnetic material becomes substantially nonmagnetic. By placing the coil L5 in contact with the tire casing or exposing it to the air within the casing, the core is heated to the temperature of the casing. The L5–C5 circuit is arranged, when the core 31 is at the Curie point temperature, to resonate at the same frequency as the L1–C3 tank in the primary unit. Where the temperature of the casing is below the Curie point, core 31 remains ferromagnetic and substantially increases the inductance of coil L5 so that the L5–C5 circuit's resonant frequency is extremely low compared to the resonant frequency of tank L1–C3. Consequently, at temperatures below the Curie point, the L5–C5 circuit is "detuned" and absorbs little energy from the primary unit. Upon the temperature of the tire reaching the Curie point, core 31 becomes nonmagnetic, permitting the L5–C5 circuit to resonate by absorbing energy inductively coupled to it from the L1–C3 tank.

In the arrangement of FIG. 3, the coils L1 and L3 are connected by a potentiometer R1 whose variable contact 34 is connected to oscillator 25. By adjustment of the variable contact, the signal to the resonant circuits L1–C3 and L3–C4 can be regulated. Take-off coils L2 and L4 are connected by a potentiometer R2 whose variable contact 35 is connected to the input of amplifier 33. The output of the amplifier is fed into an integrator 36 whose output is applied to the threshold circuit 37. The output of the threshold circuit, in turn, controls the actuation of alarm indicator 32.

Assuming that the wheel unit is arranged as indicated in FIG. 3, the potentiometers R1 and R2 are adjusted to bring the system into balance when the switch 29 is open and the tire is rotated. The takeoff coils L2 and L4 are arranged to cause their induced voltages to be in opposition and any difference in those voltages is compensated by adjustment of contact 35 to obtain a null. The output of amplifier 33, when the system is unbalanced, is a train of pulses which is integrated by the integrator 36 to obtain a varying DC output whose amplitude depends upon the degree of system unbalance. Where the amplitude of the DC output of the integrator reaches the threshold of circuit 37, that circuit emits a signal which actuates the alarm indicator 32.

To avoid false actuation of the alarm, it is preferred to require the wheel to make at least several revolutions before the signal from the integrator can be built up to the threshold level. Thus, where an unbalance is momentarily created in the system by external radiations which induce unequal voltages in coils L1 and L3, the system does not respond unless those external radiations persist for a minimum period.

Because the monitoring system here disclosed can be embodied in various physical forms, it is not intended that the invention be limited to the precise arrangement here utilized or described. Rather, it is intended that the invention be delimited by the appended claims and include those modified arrangements that do not fairly depart from the essence of the invention.

What is claimed is:

1. A system for detecting the unsafe condition of a motor vehicle tire, the system comprising
    a first inductor mounted to rotate with the tire;
    a second inductor situated to inductively couple to the first inductor;
    means for electrically energizing the second inductor;
    comparator means for comparing the electrical energy applied to the second inductor with the electrical energy applied to a standard inductor;
    a tire condition sensor mounted to rotate with the tire, the sensor responding to an unsafe condition of the tire by altering the amount of electrical energy coupled by induction from the second inductor to the first inductor; and
    means responsive to the comparator means for actuating an alarm upon the occurrence of a substantial alteration in the amount of inductively coupled energy.

2. The system according to claim 1, wherein
    the tire condition sensor is a core of ferromagnetic material whose Curie point is at a temperature that is unsafe for the tire, and
    the first inductor is a coil disposed upon the core of ferromagnetic material.

3. The system according to claim 1, wherein
    the second inductor is an element of a resonant primary circuit;
    the first inductor is an element of a secondary circuit capable of resonating at the same frequency as the primary circuit; and
    the tire condition sensor permits the secondary circuit to resonate upon the occurrence of an unsafe condition of the tire.

4. A monitor system for detecting the unsafe condition of a motor vehicle tire, the system comprising
    a stationary unit having a first resonant circuit utilizing a primary inductor;
    a source of electrical energy coupled to the first resonant circuit to cause the circuit to resonate;
    a standard resonator;
    comparator means for comparing the energy in the first resonant circuit with the energy in the standard resonator;
    a second resonant circuit mounted to rotate with the tire, the second resonant circuit utilizing a secondary inductor and the circuit being capable of resonating at the same frequency as the first resonant circuit;
    the stationary unit being mounted on the vehicle in a position where the primary inductor inductively couples to the secondary inductor during a portion of the tire's revolution;
    a tire condition sensor mounted to rotate with the tire, the sensor responding to an unsafe tire condition by enabling the secondary circuit to resonate; and
    means responsive to the comparator for actuating an alarm upon the intermittent occurrence of an appreciable change in energy in the first resonant circuit.